Nov. 16, 1943.  W. DZUS  2,334,614
DEVICE FOR POSITIONING AND FORMING APERTURES
Filed June 14, 1941
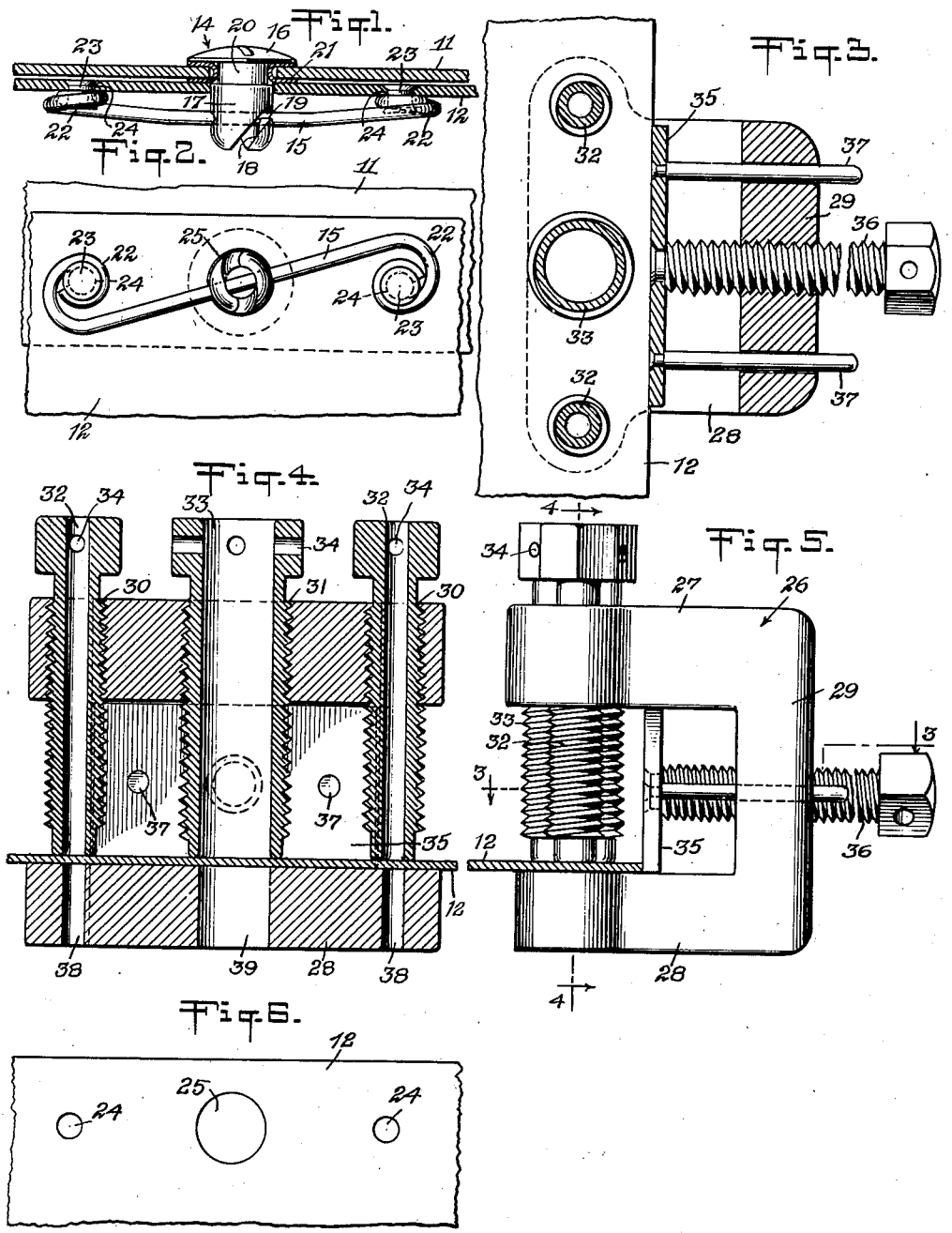
WITNESSES
INVENTOR
William Dzus
BY
ATTORNEYS Patented Nov. 16, 1943

2,334,614

UNITED STATES PATENT OFFICE 2,334,614

DEVICE FOR POSITIONING AND FORMING APERTURES

William Dzus, West Islip, N. Y.

Application June 14, 1941, Serial No. 398,138

1 Claim. (Cl. 77—62)

This invention relates to an improved tool or jig to be used in positioning, aligning, spotting, or forming apertures or the like. My device is particularly useful in positioning, aligning and forming apertures in connection with the installation of fastening devices of the type shown in my Patent No. 1,955,740, granted on April 24, 1934.

It is an object of my invention to provide an improved tool or jig, that may be used in positioning or forming one or more apertures in a desired predetermined relationship, in material of varying thicknesses, and at an adjustable predetermined distance from the edge of the material.

Among other objects is the provision of an improved tool or jig which facilitates the installation of fastening devices, particularly fastening devices of the type shown in my Patent No. 1,955,740.

In the accompanying drawing—

Fig. 1 is a side elevational view partially in section showing a fastening device made in accordance with my Patent No. 1,955,740, holding two sheets of material together;

Fig. 2 is a bottom plan view of the fastening device;

Fig. 3 is a sectional view in the direction of the arrows on the line 3—3 of Fig. 5, showing a tool or jig embodying my invention and which may be used for positioning or forming a plurality of apertures of the type required for the installation of the spring member of my fastening device;

Fig. 4 is a sectional elevational view of the tool or jig in the direction of the arrows on the line 4—4 of Fig. 5;

Fig. 5 is a side elevational view of the tool or jig;

Fig. 6 is a fragmentary plan view of the articles or part to which the spring member of my fastening device is to be attached, showing the apertures which have been positioned and formed by means of my tool or jig.

My improved tool or jig may be used in forming, positioning and aligning apertures for many different purposes. However, it is particularly useful in connection with the installation of fastening devices of the type shown in my Patent No. 1,955,740, and in the accompanying drawing I have illustrated it as being used for that purpose.

Thus, in Figs. 1 and 2, I have shown two articles or parts 11 and 12, illustrated as being held together by a fastening device of this character. The fastening device consists of a button or stud member 14, secured to the part 11, so that it may freely rotate, and a connector or spring member 15, secured to the part 12. The members 14 and 15 are so formed and so disposed that they may be interlocked in the manner shown, by simply turning the stud member 14. The stud member is provided with an enlarged head 16, which may be formed with a kerf, as shown, and a tubular shank 17, formed with oppositely disposed spiral slots 18, each having a shoulder 19 formed near the end thereof to prevent accidental retrograde movement. Immediately beneath the head 16, the stud member is provided with a neck 20, of smaller diameter than the shank, the neck being disposed in an aperture formed in the part 11. To prevent the stud member from accidental removal from the aperture, and also to permit it to be freely rotated, I provide a grommet 21, disposed around the edges of the aperture and projecting inwardly around the neck of the stud member.

The spring member 15 is made of a resilient strong material, such as wire, and at opposite ends is formed into coils, in the manner indicated at 22, the said coiled portions being secured to the article or parts 12 in some suitable manner, as by means of the rivets 23, passing through apertures 24 formed in the part. Adjacent the central portion of the spring member 15, I form the part 12, with an aperture 25, of sufficient diameter to accommodate the shank 17 of the stud member.

In order to secure the article or part 11 to the article or part 12, I superimpose the part 11 upon the part 12, and insert the shank 17 of the stud member through the aperture 25. Upon the rotation of the stud member in a clockwise direction, as viewed from the top thereof, the central portion of the spring member 15 will be engaged by the spiral slots, and will be drawn upwardly against the tension of the member until the member passes beyond the shoulder portions 19. The shoulder portions prevent accidental retrograde rotation of the stud member and the two articles or parts 11 and 12 are securely fastened together. Fastening devices of this character are well known in the industry, and have many different uses as, for instance, for securing the cowling and cover plates on aircraft in position.

In Figs. 3, 4 and 5, I have shown an improved tool or jig which may be used in positioning, aligning and forming the apertures 24 and 25 in the article or part 12. This tool or jig is provided with a rigid frame 26, which may be made of some suitable material, such as a ferrous metal. The frame comprises a pair of spaced parallel, preferably similarly shaped portions 27 and 28, connected adjacent the back thereof by means of the integral wall 29. The space between the portions 27 and 28 should be sufficient to accommodate articles or parts of the varying thicknesses to which spring members similar to the spring member 15 will be applied.

The upper portion 27 is formed with three apertures, positioned similarly to the apertures 24 and 25, formed in the plate 12. Thus, the apertures 30 correspond with the apertures 24 and are positioned adjacent the two sides of the frame, while the aperture 31 corresponds with the aperture 25, and is positioned adjacent the center of the frame.

The apertures 30 and 31 may be used as guides for drills or punches, for spotting or forming the apertures 24 and 25 at the proper positions in the plate 12. However, the apertures 30 and 31 are preferably internally threaded and receive the externally threaded tubular guides 32 and 33. The externally threaded tubular guides 32 and 33 may be adjusted upwardly and downwardly in accordance with the variations in the thickness of the material in which the apertures are to be formed.

In the embodiment illustrated in the accompanying drawing, members 32 and 33 take the form of tubular guides to accommodate drills which are used in forming the apertures 24 and 25, and the openings extending through the guides should be of the proper diameter to snugly accommodate drills of the proper size. When the members 32 and 33 are in the form of tubular guides, they are preferably adjusted so as to rest upon the upper surface of the part 12 in which the apertures are to be formed, and the members may be adjusted by screwing them upwardly or downwardly, as the case may be.

To facilitate turning of the members 32 and 33, and to aid in applying the required force when they are in the form of punches, I provide the heads of the members with transverse apertures 34, through which a nail or similar article may be inserted to serve as a lever, crank, or handle. It will be seen that the members 32 and 33 automatically position the apertures the proper distance apart, and in the proper relationship with respect to each other, so that the spring member 15 may be riveted at opposite ends to the apertures 24 with the central portion extending across the aperture 25.

The lower plate 28 is preferably provided with apertures 38 and 39 in registry with the apertures 30 and 31, to accommodate the ends of the drills or punches, when the apertures are formed or spotted.

In order to aid in positioning the apertures the desired distance from the edge of the article or part 12, I provide the tool or jig with an adjustable abutment wall 35, against which the edge of the plate or member 12 may rest while the apertures are being formed, as shown most clearly in Figs. 3 and 5. This abutment wall may be mounted as shown at the end of the adjusting screw 36, which is rotatably connected therewith, and which extends through and is threaded to the rear wall 29 of the device. To guide the shifting of the abutment wall, I preferably provide a pair of guide rods 37, connected to the abutment wall, and extending rearwardly through apertures formed in the rear wall 29. By rotating the adjusting screw 36, in a clockwise direction as viewed from the head thereof, the abutment wall 35 is shifted towards the members 32 and 33 so that the apertures will be formed relatively near to the edge of the part 12. By rotating the adjusting screw in the opposite direction, the apertures will be positioned a greater distance from the edge.

In using my improved tool or jig, I first adjust the screw 36 so as to shift the abutment wall 35 to the proper position, so that the apertures will be disposed at the desired distance from the edge of the article or part 12. The members 32 and 33 are then adjusted to permit the insertion of the part 12, which is inserted so that the edge thereof abuts against the abutment wall 35. Where the members 32 and 33 are used as drill guides, they should be adjusted so that the lower edges thereof engage or are positioned near the upper surface of the part 12. The drills are then inserted downwardly through the guide members 32 and 33, so as to form the apertures. In this connection, drills of the proper size should be employed and the drill guides 32 and 33 should be of the proper size to accommodate the drills.

Where the members 32 and 33 are in the form of punches, they should be screwed downwardly so as to spot the part 12 or so as to punch holes therethrough. Where the article or part 12 is merely spotted, it is thereafter drilled through at the spotted points. Thereafter the spring member 15 may be applied to the part 12 by means of rivets extending through the coiled end portions 22 and the apertures 24. Due to the fact that the apertures have been properly positioned, with respect to each other by my tool or jig, the central portion of the spring member 15 will then extend over the aperture 25. It should be understood that for installing spring members 15 of different sizes, the distance between the members 32 and 33 may be correspondingly moved. Also the arrangement of the members 32 and 33 may be changed when the tool or jig is to be used for other purposes.

While I have illustrated and described specific forms of my invention, it should be understood that modifications may be made. Thus, my improved tool or jig may be used for purposes other than the installation of fastening devices of the type illustrated, and also the relative spacing and arrangement of the members 32 and 33 may be varied so as to form the apertures in different relationship

I claim:

A device for spotting or forming apertures in an article comprising a frame having a pair of spaced parallel members and a connecting portion between the members, one of said members having means including an aperture extending therethrough and adapted to serve as a guide for a tool, an adjustable abutment wall disposed between the members and shiftable towards and away from the connecting portion, said connecting portion being formed with a threaded aperture and a plurality of unthreaded apertures extending therethrough, guide rods connected to the abutment wall and extending through the unthreaded apertures in the connecting portion, and a threaded adjusting rod connected to the abutment wall and extending through the threaded aperture in the connecting portion whereby the abutment wall may be adjusted towards and away from the connecting portion.

WILLIAM DZUS.